(12) United States Patent
Wakugawa et al.

(10) Patent No.: US 9,061,698 B2
(45) Date of Patent: Jun. 23, 2015

(54) SPEED REDUCER AND ELECTRIC POWER STEERING SYSTEM

(71) Applicant: JTEKT CORPORATION, Osaka-shi, Osaka (JP)

(72) Inventors: Yuji Wakugawa, Kashihara (JP); Ryuji Nakata, Osaka (JP); Atsuhiro Yoshida, Nara (JP); Wataru Yamada, Kashiwara (JP); Jun Hamakita, Kashihara (JP); Hideyuki Honkado, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/046,014

(22) Filed: Oct. 4, 2013

(65) Prior Publication Data

US 2014/0102235 A1     Apr. 17, 2014

(30) Foreign Application Priority Data

Oct. 12, 2012   (JP) .................... 2012-227084

(51) Int. Cl.
| | |
|---|---|
| B62D 5/04 | (2006.01) |
| B62D 3/04 | (2006.01) |
| F16H 1/16 | (2006.01) |
| F16H 57/04 | (2010.01) |
| F16H 57/039 | (2012.01) |

(52) U.S. Cl.
CPC .. B62D 3/04 (2013.01); F16H 1/16 (2013.01); *Y10T 74/19828* (2015.01); F16H 57/0498 (2013.01); F16H 57/0464 (2013.01); B62D 5/0409 (2013.01); F16H 57/039 (2013.01)

(58) Field of Classification Search
CPC ................. B62D 5/0409; B62D 5/0448
USPC ....................... 180/444; 74/388 P
See application file for complete search history.

(56) References Cited

U.S. PATENT DOCUMENTS

| | | | |
|---|---|---|---|
| 7,591,341 B2 * | 9/2009 | Shimamoto et al. | 180/444 |
| 7,786,058 B2 * | 8/2010 | Kuwabara et al. | 508/363 |
| 2006/0175123 A1 * | 8/2006 | Yabe et al. | 180/444 |
| 2006/0191736 A1 * | 8/2006 | Maeda et al. | 180/444 |

FOREIGN PATENT DOCUMENTS

| | | |
|---|---|---|
| EP | 2 489 901 A1 | 8/2012 |
| JP | A-2005-69476 | 3/2005 |
| JP | A-2005-176527 | 6/2005 |
| JP | A-2006-76443 | 3/2006 |
| JP | A-2007-303487 | 11/2007 |
| JP | A-2009-248724 | 10/2009 |

OTHER PUBLICATIONS

Extended Search Report issued in European Patent Application No. 13188040.3 dated Feb. 11, 2014.

* cited by examiner

*Primary Examiner* — Tony Winner
(74) *Attorney, Agent, or Firm* — Oliff PLC

(57) ABSTRACT

A speed reducer for an electric power steering system includes a worm, a worm wheel, and a housing. Only a meshing section where the worm and the worm wheel mesh with each other and a space between the worm wheel and the housing are filled with grease. The grease in the space is in contact with both tooth surfaces of the worm wheel and an inner peripheral face of the housing, the inner peripheral face facing the worm wheel.

4 Claims, 3 Drawing Sheets

SPEED REDUCER AND ELECTRIC POWER STEERING SYSTEM

INCORPORATION BY REFERENCE

The disclosure of Japanese Patent Application No. 2012-227084 filed on Oct. 12, 2012 including the specification, drawings and abstract, is incorporated herein by reference in its entirety.

BACKGROUND OF THE INVENTION

1. Field of the Invention

The invention relates to a speed reducer and an electric power steering system that includes the speed reducer.

2. Description of the Related Art

Generally, in an electric power steering system, torque output from a steering-assist electric motor is amplified by reducing, with the use of a speed reducer, the speed of rotation transmitted from a rotary shaft of the electric motor. The amplified torque is transmitted to a steering mechanism, such as a rack-and-pinion mechanism, whereby torque assist is provided to an operation of the steering mechanism caused in response to a driver's steering operation. As the speed reducer, for example, a worm speed reducer constructed of a worm and a worm wheel that mesh with each other is used. The worm speed reducer includes a housing that houses the worm and the worm wheel, and is supplied with grease.

The grease supplied into the speed reducer lies between tooth surfaces of the worm and tooth surfaces of the worm wheel, and forms oil films. The oil films formed by the grease functions to assist sliding between the tooth surfaces caused by the rotation of the worm due to the rotation of the rotary shaft of the electric motor and the rotation of the worm wheel due to the rotation of the worm, and functions to buffer impacts that occur between the tooth surfaces due to the rotations, thereby reducing rattling noise generated by the impacts. Therefore, supplying the speed reducer with the grease makes it possible to reduce steering torque of the electric power steering system and suppress rattling noise, thereby improving a driver's steering feel.

The characteristics, such as a viscosity, of the grease are appropriately adjusted by taking into account, for example, the use of the grease and the usage environment of the grease. Commonly-used grease has a low fluidity, and therefore is easily extruded from a meshing section at which the worm and the worm wheel mesh with each other, due to a sliding motion of the worm itself caused by the rotations of the worm and the worm wheel. Once the grease is extruded from the meshing section due to the sliding motion, the extruded grease accumulates around the meshing section, and does not automatically return to the meshing section.

Therefore, the meshing section runs out of grease, so that the effect of assisting sliding between tooth surfaces and the effect of buffering impacts between the tooth surfaces, which are produced by the grease oil films, are no longer obtained. Therefore, for example, in the case of an electric power steering system, the steering torque increases and rattling noise is generated. As a result, the driver's steering feel deteriorates. In order to cope with the above-described phenomenon, not only the meshing section but also, for example, substantially the entire space inside the housing is filled with grease.

In some cases, there is provided a structure for circulating the grease extruded from the meshing section to return the grease to the meshing section as the worm and the worm wheel rotate. Refer to, for example, Japanese Patent Application Publication No. 2005-69476 (JP 2005-69476 A), Japanese Patent Application Publication No. 2006-76443 (JP 2006-76443 A), and Japanese Patent Application Publication No. 2007-303487 (JP 2007-303487 A).

In order to fill substantially the entire space inside the housing with grease as described above, a large amount of grease is required. If a large amount of grease is present in the speed reducer, the grease may enter, for example, a rolling bearing and affect the performance of the speed reducer, or the grease may leak through gaps of the housing and make its surroundings dirty. Furthermore, an increase in the amount of grease results in a cost increase.

Even if a large amount of grease is supplied, the grease is extruded from the meshing section with the rotations. After the grease is extruded from the meshing section, the meshing section is not automatically replenished with new grease because the conventional grease has a low fluidity as described above. Therefore, it is not possible to prevent the meshing section from running out of the grease. On other hand, when the mechanism for circulating the grease within, for example, the housing is provided, the grease is automatically returned by the mechanism to the meshing section at which the worm and the worm wheel mesh with each other, as the worm and the worm wheel rotate. Therefore, it is possible to reduce the total amount of grease that is supplied into the housing, and to prevent the meshing section from running out of the grease.

However, provision of the mechanism complicates the structures of the housing, the speed reducer and the like, leading to increases in the costs of the speed reducer, the electric power steering system and the like.

SUMMARY OF THE INVENTION

One object of the invention is to provide a speed reducer configured such that shortage of grease is reliably prevented just by supplying a small amount of grease, without the need for complication of the overall structure, and to provide an electric power steering system that includes the speed reducer.

A speed reducer according to an aspect of the invention includes: a worm; a worm wheel that meshes with the worm; and a housing that houses the won't and the worm wheel. In the speed reducer, the housing has a generally cylindrical portion arranged with a space having a constant width left between the generally cylindrical portion and an outer periphery of the worm wheel. Only a meshing section where the worm and the worm wheel mesh with each other and the space between the outer periphery of the worm wheel and the generally cylindrical portion are filled with grease. The grease in the space is in contact with both tooth surfaces of the worm wheel and an inner peripheral face of the generally cylindrical portion, the inner peripheral face facing the worm wheel.

With the configuration in the above-described aspect, the grease supplied to the space between the outer periphery of the worm wheel and the generally cylindrical portion of the housing (hereinafter, referred to as "outer peripheral space" where appropriate) so as to be in contact with both the tooth surfaces of the worm wheel and the inner peripheral face of the generally cylindrical portion, which faces the worm wheel, functions to prevent the grease from being extruded from the meshing section, where the worm and the worm wheel mesh with each other, due to a sliding motion of the worm itself caused by the rotations of the worm and the worm wheel. Even if the grease is extruded from the meshing section, the grease in the outer peripheral space is supplied to the meshing section with the rotations.

Therefore, it is possible to prevent the meshing section from running out of the grease, just by supplying the grease only to the meshing section, at which the worm and the worm wheel mesh with each other, and the outer peripheral space between the outer periphery of the worm wheel and the generally cylindrical portion, without filling substantially the entire space inside the housing with a large amount of grease, and, further, without the need for complication of the structure of the speed reducer.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
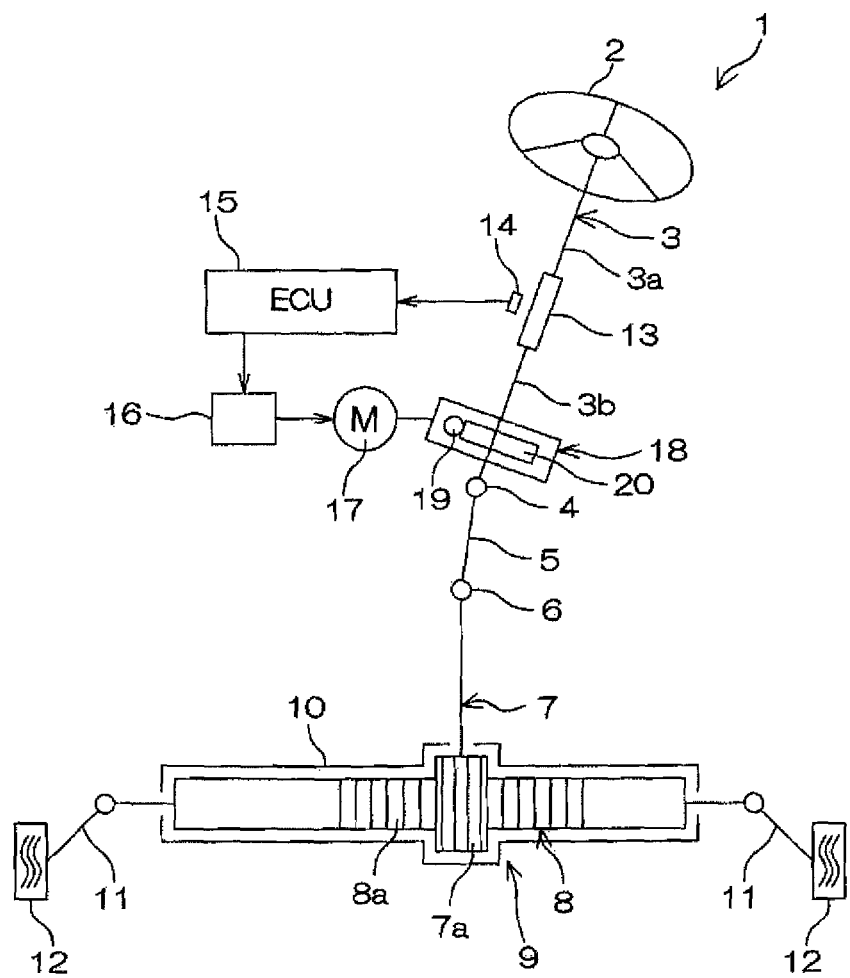
FIG. 1 is a view schematically illustrating an example of an electric power steering system according to an embodiment of the invention.

Hereinafter, embodiments of the invention will be described with reference to the accompanying drawings. Referring to FIG. 1, an electric power steering system 1 according to an embodiment of the invention includes: a steering shaft 3 connected to a steering member 2, such as a steering wheel, so as to be rotatable together with the steering member 2; an intermediate shaft 5 connected to the steering shaft 3 via a universal joint 4; and a pinion shaft 7 connected to the intermediate shaft 5 via a universal joint 6. The electric power steering system 1 further includes a rack bar 8 that has rack teeth 8a that mesh with pinion teeth 7a formed on the pinion shaft 7. The rack bar 8 functions as a steered shaft that extends in the lateral direction of an automobile.

The pinion shaft 7 and the rack bar 8 constitute a steering mechanism 9 that is formed of a rack-and-pinion mechanism. The rack bar 8 is supported by a plurality of bearings (not shown) so as to be able to make a linear reciprocating motion, in a rack housing 10 that is fixed to a vehicle body. Two end portions of the rack bar 8 extend toward respective sides of the rack housing 10, and tie rods 11 are connected to the respective end portions of the rack bar 8.

The tie rods 11 are connected to corresponding steered wheels 12 via corresponding knuckle arms (not shown). When the steering shaft 3 is rotated in response to an operation of steering member 2, the rotation is converted into a linear motion of the rack bar 8 that extends in the lateral direction of the automobile, by the pinion teeth 7a and the rack teeth 8a, whereby the steered wheels 12 are steered.

The steering shaft 3 is split into an input shaft 3a connected to the steering member 2 and an output shaft 3b connected to the pinion shaft 7. The input shaft 3a and the output shaft 3b are connected to each other via a torsion bar 13 so as to be rotatable relative to each other on the same axis. Furthermore, the torsion bar 13 is provided with a torque sensor 14 that detects a steering torque on the basis of the amount of relative rotational displacement between the input shaft 3a and the output shaft 3b. The result of torque detection obtained by the torque sensor 14 is provided to an electric control unit (ECU) 15.

The ECU 15 executes drive control on an electric motor 17 for steering-assist, via a drive circuit 16, on the basis of the result of torque detection, the result of vehicle speed detection provided from a vehicle speed sensor (not shown), and the like. The rotation output from the electric motor 17 is transmitted to the pinion shaft 7 via a speed reducer 18 where the speed of rotation is reduced, and then is converted into a linear motion of the rack bar 8. In this way, steering is assisted.

Figure 2:
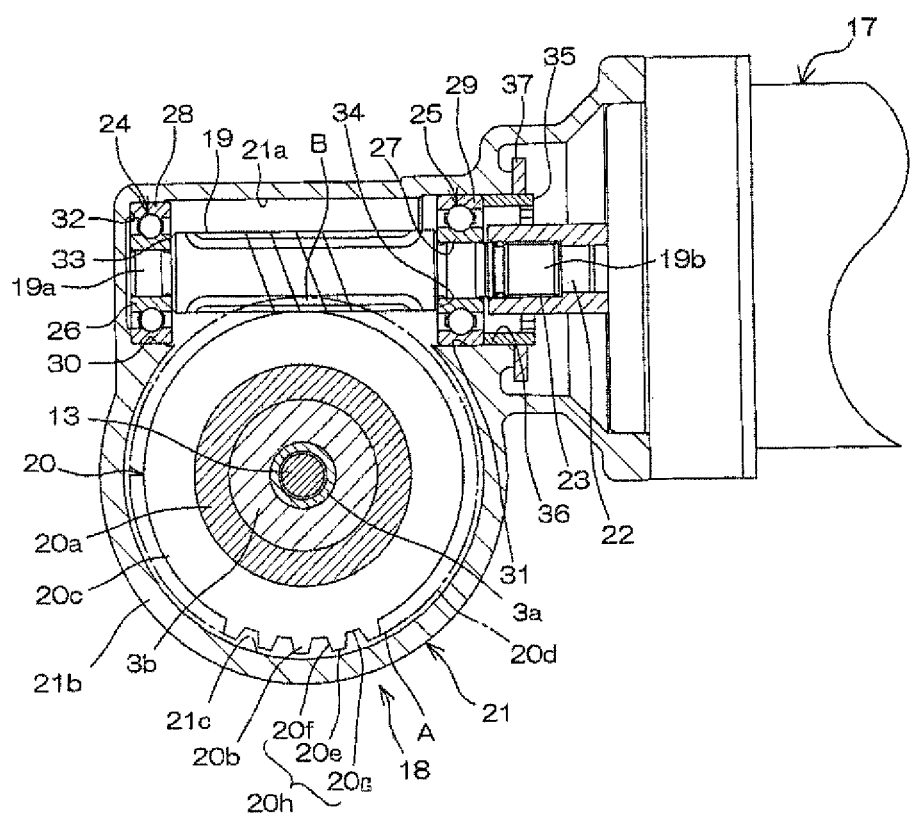
FIG. 2 is a sectional view illustrating an example of a speed reducer according to the embodiment.

Referring to FIG. 1 and FIG. 2, the speed reducer 18 includes: a worm 19 serving as an input shaft that is driven to be rotated by the electric motor 17; and a worm wheel 20 that meshes with the worm 19 and that is connected to the output shaft 3b of the steering shaft 3 so as to be rotatable together with the output shaft 3b. The worm 19 and the worm wheel 20 are housed in a housing 21.

The worm 19 is connected to a rotary shaft 22 of the electric motor 17 via a spline joint 23. The worm 19 is rotatably supported by two rolling bearings 24, 25 that are retained by the housing 21. Inner rings 26, 27 of the rolling bearings 24, 25 are fitted to corresponding narrowed portions of the worm 19. Outer rings 28, 29 of the rolling bearings 24, 25 are retained in bearing holding holes 30, 31 of the housing 21, respectively. The housing 21 has a tubular portion 21a that houses the worm 19.

The outer ring 28 of the rolling bearing 24 that supports a first end portion 19a of the worm 19 is positioned by being brought into contact with a step portion 32 of the housing 21. The inner ring 26 of the rolling bearing 24 is brought into contact with a positioning step portion 33 of the worm 19, and is thereby restrained from moving toward a second end portion 19b of the worm 19. The inner ring 27 of the rolling bearing 25 supports a portion of the worm 19 that is near the second end portion 19b, which is a joint-side end portion of the worm 19. The inner ring 27 is brought into contact with a positioning step portion 34 of the worm 19, and is thereby restrained from moving toward the first end portion 19a.

The outer ring 29 is urged toward the rolling bearing 24 by a screw member 35 for preload adjustment. The screw member 35 is screwed into a threaded hole 36 formed in the housing 21 so as to apply a preload to a pair of the rolling bearings 24, 25 and position the worm 19 in the axial direction of the worm 19. A locknut 37 is engaged with the screw member 35 in order to fix the position of the screw member 35 after the preload is adjusted.

The worm wheel 20 includes: an annular metal core 20a that is coupled to the output shaft 3b so as to be rotatable together with the output shaft 3b; and a synthetic resin member 20c that surrounds the periphery of the metal core 20a and that has teeth 20b on its outer peripheral face portion. The metal core 20a is inserted in a molding die, for example, during resin molding of the synthetic resin member 20c. Through the resin molding performed with the metal core 20a inserted in the molding die, the metal core 20a and the synthetic resin member 20c are coupled to and integrated with each other. The output shaft 3b is supported so as to be rotatable relative to the housing 21, by a pair of rolling bearings (not shown) disposed such that the worm wheel 20 is interposed between the rolling bearings in the axial direction of the worm wheel 20.

Figure 3:
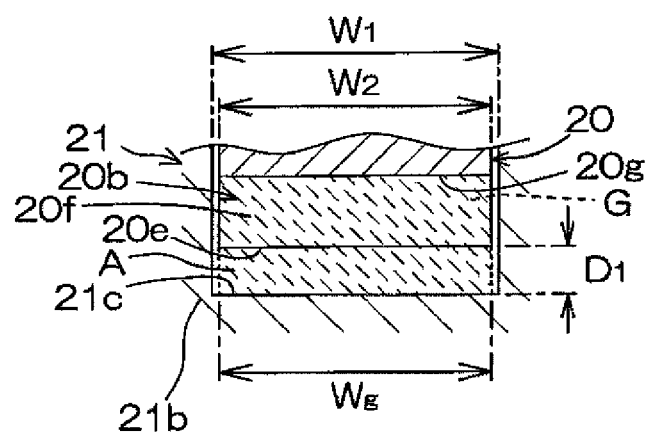
FIG. 3 is an enlarged sectional view illustrating part of a worm wheel and a housing of the speed reducer.

Referring to FIG. 2 and FIG. 3, the housing 21 has a generally cylindrical portion 21b arranged with an outer peripheral space A having a constant width left between the generally cylindrical portion 21b and an outer periphery 20d of the worm wheel 20. In the present embodiment of the invention, only the outer peripheral space A and a meshing section B, at which the worm 19 and the worm wheel 20 mesh with each other, are filled with grease G. As indicated by hatching with dashed lines in FIG. 3, the grease G is supplied into the outer peripheral space A such that the grease G is in contact with both tooth surfaces 20h of the teeth 20b of the worm wheel 20, each of which has a tooth tip 20e, tooth flanks 20f that are brought into contact with the worm 19, and a bottomland 20g, and an inner peripheral face 21c of the generally cylindrical portion 21b, which faces the worm wheel 20.

The grease G supplied into the outer peripheral space A functions to prevent the grease G from being extruded from the meshing section B at which the worm 19 and the worm wheel 20 mesh with each other. If the grease G in the meshing section B is extruded, the grease G in the outer peripheral space A is supplied to the meshing section B with the rotations of the worm 19 and the worm wheel 20.

Therefore, it is possible to prevent the meshing section B from running out of the grease and to maintain the state where a sufficient amount of grease to lubricate the meshing section B is always present at the meshing section B, just by supplying the grease G only to the meshing section B, at which the worm 19 and the worm wheel 20 mesh with each other, and the outer peripheral space A between the worm wheel 20 and the generally cylindrical portion 21b, without filling substantially the entire space inside the housing 21 with a large amount of grease, and, further, without the need for complication of the structure of the speed reducer 18.

Therefore, the coefficient of sliding friction between the tooth surfaces of the worm 19 and the tooth surfaces of the worm wheel 20 can be appropriately reduced by lubrication provided by the grease oil films, and the oil films can buffer the impacts between the tooth surfaces, thereby suppressing generation of rattling noise.

Referring to FIG. 3, preferably, a width $W_1$ of the inner peripheral face of the generally cylindrical portion of the hoising 21b in the axial direction of the worm wheel 20 is substantially equal to a facewidth $W_2$ of the worm wheel 20. More specifically, the width $W_1$ is preferably less than or equal to 130% of the facewidth $W_2$, and, more preferably less than or equal to 120% of the facewidth $W_2$.

Adoption of the aforementioned dimensional relationship reduces the volume of the outer peripheral space A. Therefore, it is possible to reduce the amount of grease required to fill the outer peripheral space A with the grease such that the grease is in contact with both the tooth surfaces 20h of the worm wheel 20 and the inner peripheral face 21c of the generally cylindrical portion 21b as described above. Furthermore, it is possible to prevent the grease supplied to the outer peripheral space A from moving onto the side faces of the worm wheel 20.

Because the amount of grease supplied to the housing 21 is restricted to the minimum necessary amount, it is possible to prevent the situation where excess grease enters, for example, the rolling bearings 24, 25 incorporated in the speed reducer 18 and affects the performance of the speed reducer 18, and the situation where the grease leaks through gaps of the housing 21 and makes its surroundings dirty. Furthermore, restricting the amount of grease to the minimum necessary amount makes it possible to reduce the total amount of grease and to thereby reduce the cost.

In order to allow the worm wheel 20 to smoothly rotate relative to the housing 21, the width $W_1$ is preferably greater than or equal to 105% of the facewidth $W_2$, within the aforementioned range. The filling width Wg, which is a range where the grease supplied to the outer peripheral space A is present, in the axial direction of the worm wheel 20, is preferably less than or equal to the width $W_1$ of the inner peripheral face of the generally cylindrical portion of the hoising 21b and greater than or equal to the facewidth $W_2$ of the worm wheel 20.

In the outer peripheral space A, a shortest distance $D_1$ is the shortest distance between the worm wheel 20 and the inner peripheral face 21c of the generally cylindrical portion 21b in the radial direction of the worm wheel 20, that is, the distance between each tooth tip 20e of the worm wheel 20 and the inner peripheral face 21c of the generally cylindrical portion 21b. The shortest distance $D_1$ is preferably less than or equal to 1.6 mm. By adopting the aforementioned dimensional relationship, the grease present in the outer peripheral space A is allowed to function as a wall, so that the grease is prevented from being extruded from the meshing section B where the worm 19 and the worm wheel 20 mesh with each other. Furthermore, because the volume of the outer peripheral space A is small, the amount of grease required to fill the space A with the grease is reduced.

In order to ensure the required amount of grease, the shortest distance $D_1$ is preferably greater than or equal to 0.5 mm, within the aforementioned range.

As the grease G, a low-viscosity grease of which the viscosity at 100° C. and a sheering speed of $100 \ s^{-1}$ is less than or equal to 2 Pa·s is preferably employed. The aforementioned viscosity of the grease is a value measured by a rotary rheometer (MCR 301 manufactured by Anton Paar) with the use of a cone plate.

If the grease having a relatively low viscosity is used, the grease exhibits a fluidity higher than that of conventionally-used grease, for example, during operation of the speed reducer 18 incorporated in the electric power steering system 1. Therefore, if the grease is extruded from the meshing section B as the worm 19 and the worm wheel 20 rotate, the extruded grease or new grease promptly flows into the meshing section B with the rotations.

Therefore, it is possible to maintain the state where the meshing section B, where the worm 19 and the worm wheel 20 mesh with each other, is always filled with a sufficient amount of grease to lubricate the meshing section B. Therefore, the coefficient of sliding friction between the tooth surfaces of the worm 19 and the tooth surfaces of the worm wheel 20 can be appropriately reduced by lubrication provided by the grease oil films, and the oil films can buffer the impacts between the tooth surfaces, thereby suppressing generation of rattling noise.

The viscosity of the grease G at 100° C. and a sheering speed of $100 \ s^{-1}$ is preferably greater than or equal to 0.3 Pa·s, within the aforementioned range.

If the viscosity of the grease is below the lower limit of the aforementioned range, the grease is excessively soft. Therefore, even if a sufficient amount of the grease is automatically supplied to the meshing section B due to its high fluidity, the grease flows out of a predetermined position due to vibration, centrifugal force caused by rotation, and other external forces. This may cause a possibility that grease oil films having a thickness sufficient to reduce friction and suppress rattling noise will not be formed. On the basis of the above-described facts, the viscosity of the grease is preferably greater than or equal to 0.5 Pa·s and less than or equal to 1.5 Pa·s, within the aforementioned range.

Examples of base oils for the grease G include one or more kinds of synthetic oils, such as synthetic hydrocarbon oils, more specifically, poly-α-olefin oils (PAO), silicone oils, fluorine oils, ester oils, and ether oils, and mineral oils. Specifically, synthetic hydrocarbon oils are preferable. Examples of thickeners include one or more kinds of various thickeners including soap-based thickeners, urea-based thickeners, organic thickeners, and inorganic thickeners.

Examples of the soap-based thickeners include one or more kinds of: metal soap type thickeners, such as aluminum soap, calcium soap, lithium soap, and sodium soap; mixed base soap type thickeners, such as lithium-calcium soap, and sodium-calcium soap; complex type thickeners, such as aluminum complexes, calcium complexes, lithium complexes, and sodium complexes.

Examples of the urea-based thickeners include polyurea. Examples of the organic thickeners include one or more kinds of polytetrafluoroethylene (PTFE), and sodium terephthalate. Examples of the inorganic thickeners include one or more kinds of bentonite, graphite, and silica gel. One or more kinds of additives selected from: solid lubricants such as fluorine resins (PTFE, etc.), molybdenum disulfide, graphite, and polyolefin-based waxes (including amides and the like); phosphorus-based or sulfur-based extreme-pressure additives; antioxidants such as tributyl phenol, and methyl phenol; rust preventives; metal deactivators; viscosity index improvers; and oiliness improvers.

The amount of the grease G supplied to the housing 21 may be set to a value within such an appropriate range that there are not caused a problem that excess grease enters, for example, the rolling bearings 24, 25 incorporated in the speed reducer 18 and affects the performance of the speed reducer 18 and a problem that the grease leaks through gaps of the housing 21 and makes its surroundings dirty as described above. For example, the aforementioned low-viscosity grease of which the viscosity at 100° C. and a sheering speed of 100 $s^{-1}$ is less than or equal to 2 Pa·s has high fluidity and is therefore likely to cause the aforementioned problems. Therefore, if the filling ratio when the entire space inside the housing 21 is filled with the grease is expressed by 100% and the filling ratio when there is no grease in the housing 21 is expressed by 0%, the filling ratio is preferably set to a value greater than or equal to 9% and less than or equal to 22%.

The state where the filling ratio is 100% means a state where the outer peripheral space A inside the housing 21, the meshing section B and the tubular portion 21a of the housing 21 are entirely filled with the grease G with no clearance left within the housing 21. If the filling ratio is below the lower limit of the aforementioned range, there is a possibility that the effect of reducing the coefficient of sliding friction between the tooth surfaces of the worm 19 and the tooth surfaces of the worm wheel 20 and the effect of buffering the impacts between the tooth surfaces to suppress generation of rattling noise, which are to be produced by supplying the grease, will no longer be obtained.

On the other hand, if the filling ratio exceeds the upper limit of the aforementioned range, there is a possibility that excess grease will enter, for example, the rolling bearings 24, 25 incorporated in the speed reducer 18 and affect the performance of the speed reducer 18, or a possibility that the grease will leak through gaps of the housing 21 and make its surroundings dirty.

Note that, the invention is not limited to the embodiment illustrated in FIG. 1 to FIG. 3. For example, the structure of the speed reducer according to the invention may be applied to speed reducers for systems other than electric power steering systems. Furthermore, the invention may be implemented in various modified embodiments within the scope of the invention defined in the appended claims.

Configurations of a plurality of examples in which the embodiment of the invention is applied to electric power steering systems will be described below. In a first example, the speed reducer 18 described below was prepared. The speed reducer 18 has the internal structure shown in FIG. 2. In the speed reducer 18, the width $W_1$ of the inner peripheral face of the generally cylindrical portion of the hoising in the axial direction of the worm wheel 20 is 130% of the facewidth $W_2$ of the worm wheel 20. In the outer peripheral space A, the shortest distance $D_1$ in the radial direction of the worm wheel 20 between the worm wheel 20 and the inner peripheral face 21c of the generally cylindrical portion 21b of the housing 21 is 1.4 mm. The prepared speed reducer 18 was incorporated to obtain the electric power steering system 1 as illustrated in FIG. 1.

Grease of which the viscosity at 100° C. and a sheering speed of 100 $s^{-1}$ is 1.0 Pa·s was used as the grease G. The grease G was supplied only to the meshing section B, where the worm 19 and the worm wheel 20 mesh with each other, and the outer peripheral space A within the housing 21 such that, in the outer peripheral space A, the grease G is in contact with both the tooth surfaces 20h of the worm wheel 20 and the inner peripheral face 21c of the generally cylindrical portion 21b. The filling ratio of the grease G was set to 9%. Furthermore, the filling width Wg of the grease G was set to 100% of the facewidth $W_2$ of the worm wheel 20.

In a second example, the same grease G as that used in the first example was supplied to the housing 21 of the speed reducer 18 of the same electric power steering system 1 as that used in the first example, so that only the meshing section B, where the worm 19 and the worm wheel 20 mesh with each other, and the outer peripheral space A were filled with the grease G and, in the outer peripheral space A, the grease G was in contact with both the tooth surfaces 20h of the worm wheel 20 and the inner peripheral face 21c of the generally cylindrical portion 21b. The filling ratio of the grease G was set to 11%. The filling width Wg of the grease G was set to 120% of the facewidth $W_2$ of the worm wheel 20.

In a third example, the same grease G as that used in the first example was supplied to the housing 21 of the speed reducer 18 of the same electric power steering system 1 as that used in the first example, so that only the meshing section B, where the worm 19 and the worm wheel 20 mesh with each other, and the outer peripheral space A were filled with the grease G and, in the outer peripheral space A, the grease G was in contact with both the tooth surfaces 20h of the worm wheel 20 and the inner peripheral face 21c of the generally cylindrical portion 21b. The filling ratio of the grease G was set to 22%. The filling width Wg of the grease G was set to 130% of the facewidth $W_2$ of the worm wheel 20.

In order to confirm the effectiveness of the foregoing examples, comparative examples having other configurations were set. Experiments were conducted under both the conditions of the comparative examples and the conditions of the foregoing examples to confirm superiority of the foregoing examples.

In a first comparative example, the speed reducer 18 of the same electric power steering system 1 as that used in the first example was used, but no grease was supplied to the housing 21. The filling ratio was 0%. In a second comparative example, the same grease G as that used in the first example was supplied to the housing 21 of the speed reducer 18 of the same electric power steering system 1 as that used in the first example, so that only the meshing section B, where the worm 19 and the worm wheel 20 mesh with each other, and the outer peripheral space A were filled with the grease G and, in the outer peripheral space A, the grease G was in contact with only the tooth surfaces 20h of the worm wheel 20. The filling ratio of the grease G was set to 2%.

In a third comparative example, the same grease G as that used in the first example was supplied to the housing 21 of the speed reducer 18 of the same electric power steering system 1 as that used in the first example, so that only the outer peripheral space A was filled with the grease G and, in the outer peripheral space A, the grease G was in contact with only the inner peripheral face 21c of the generally cylindrical portion 21b. The filling ratio of the grease G was set to 4%. The filling width Wg of the grease G on the inner peripheral face 21c was set to 100% of the facewidth $W_2$ of the worm wheel 20.

In a fourth comparative example, the same grease G as that used in the first example was supplied to the housing 21 of the speed reducer 18 of the same electric power steering system 1 as that used in the first example, so that only the meshing section B, where the worm 19 and the worm wheel 20 mesh with each other, and the outer peripheral space A were filled with the grease G and, in the outer peripheral space A, the grease G was in contact with only the tooth surfaces 20h of the worm wheel 20. The filling ratio of the grease G was set to 4%.

In a fifth comparative example, the same grease G as that used in the first example was supplied to the housing 21 of the speed reducer 18 of the same electric power steering system 1 as that used in the first example, so that the entire space inside the housing 21 is filled with the grease G with no clearance left in the housing 21. The filling ratio of the grease G was set to 100%. The filling width Wg of the grease G was set to 130% of the facewidth $W_2$ of the worm wheel 20.

In each of the examples and the comparative examples, the amplitude of vibration was measured by a method described below, and the magnitude of rattling noise was evaluated. The amplitude of vibration of the housing 21 caused by inputting vibration into the electric power steering system 1 from the tie rods 11 was measured. The magnitudes of rattling noise in the examples and the comparative examples were evaluated by the amplitudes of vibration expressed in percentage using the amplitude of vibration in the first comparative example as 100%.

The presence or absence of leakage of the grease from the housing 21 was checked after the electric power steering system 1 was operated continuously for 42 hours under an environment of 100° C.

The conditions set for the first to third examples and the first to fifth comparative examples are shown in Table 1, and results of evaluation are shown in Table 2.

The vibration amplitudes in the second to fourth comparative examples shown in Table 2 indicate that, when the grease was supplied to the outer peripheral space A so as to be in contact with the tooth surfaces 20h of the worm wheel 20 or the inner peripheral face 21c of the generally cylindrical portion 21b of the housing 21, generation of rattling noise was suppressed more reliably than in the first comparative example where no grease was supplied to the outer peripheral space A, but the effect was not sufficient. The vibration amplitude in the fifth comparative example indicates that, when the entire space in the housing 21 was filled with the grease with no clearance left within the housing 21, rattling noise was reduced to a level lower than that in each of the second to fourth comparative examples. However, in the fifth comparative example, leakage of grease was confirmed.

On the other hand, the results of observations on the vibration amplitude and presence or absence of grease leakage in the first to third examples in Table 2 indicate that it is possible to considerably reduce rattling noise without causing leakage of the grease, by filling only the meshing section B and the outer peripheral space A, instead of the entire space inside the housing 21, with the grease such that the grease is in contact with both the tooth surfaces 20h of the worm wheel 20 and the inner peripheral face 21c of the generally cylindrical portion 21b of the housing 21 in the outer peripheral space A.

The results in the first to third examples indicate that, when the grease filling ratio is greater than or equal to 9% and less than or equal to 22%, the vibration amplitude is small, and therefore the range from 9% to 22% is an appropriate range. The results in the first to third examples indicate that the ratio of the width $W_1$ of the outer peripheral space A to the facewidth $W_2$ is preferably be less than or equal to 130%. In particular, the result in the second example indicates that the vibration amplitude is smallest when the ratio of the filling width $W_g$ to the facewidth $W_2$ is at or around 120%. The results in the first to third examples indicate that the vibration amplitude is small when the shortest distance $D_1$ between the worm wheel 20 and the inner peripheral face 21c of the generally cylindrical portion 21b of the housing 21 in the radial direction of the worm wheel 20 is 1.4 mm.

TABLE 1

| | W1 (%) | D1 (mm) | Presence or absence of grease at meshing section B | Presence or absence of grease at tooth surfaces 20 h | Presence or absence of grease at inner peripheral face 21c | Filling ratio (%) | Filling width Wg (%) | Viscosity (Pa · s) |
|---|---|---|---|---|---|---|---|---|
| First example | 130 | 1.4 | Present | Present | Present | 9 | 100 | 1.0 |
| Second example | 130 | 1.4 | Present | Present | Present | 11 | 120 | 1.0 |
| Third example | 130 | 1.4 | Present | Present | Present | 22 | 130 | 1.0 |
| First comparative example | 130 | 1.4 | Absent | Absent | Absent | 0 | — | — |
| Second comparative example | 130 | 1.4 | Present | Present | Absent | 2 | — | 1.0 |
| Third comparative example | 130 | 1.4 | Absent | Absent | Present | 4 | 100 | 1.0 |
| Fourth comparative example | 130 | 1.4 | Present | Present | Absent | 4 | — | 1.0 |
| Fifth comparative example | 130 | 1.4 | Present | Present | Present | 100 | 130 | 1.0 |

TABLE 2

| | Vibration amplitude (%) | Grease leakage |
|---|---|---|
| First example | 51.7 | Absent |
| Second example | 47.3 | Absent |
| Third example | 49.8 | Absent |
| First comparative example | 100 | Absent |
| Second comparative example | 66.2 | Absent |
| Third comparative example | 68.2 | Absent |
| Fourth comparative example | 64.7 | Absent |
| Fifth comparative example | 53.7 | Present |

What is claimed is:

1. A speed reducer, comprising:
a worm;
a worm wheel that meshes with the worm; and
a housing that houses the worm and the worm wheel, wherein
the housing has a generally cylindrical portion arranged with a space having a constant width between the generally cylindrical portion and an outer periphery of the worm wheel, only (i) a meshing section where the worm and the worm wheel mesh with each other, and (ii) the space between the outer periphery of the worm wheel and the generally cylindrical portion are filled with grease, the grease in the space is in contact with both a tooth surface of the worm wheel and an inner peripheral face of the generally cylindrical portion, the inner peripheral face facing the worm wheel, in the space, a shortest distance between the worm wheel and the inner peripheral face of the generally cylindrical portion in a radial direction of the worm wheel is less than or equal to 1.6 mm, and a viscosity of the grease at 100° C. and a sheering speed of $100 \text{ s}^{-1}$ is less than or equal to 2 Pa·s.

2. The speed reducer according to claim 1, wherein a width of the inner peripheral face of the generally cylindrical portion of the housing in an axial direction of the worm wheel is substantially equal to a width of a face of the worm wheel.

3. An electric power steering system, comprising the speed reducer according to claim 1.

4. An electric power steering system, comprising the speed reducer according to claim 2.

* * * * *